United States Patent
Jin

(10) Patent No.: US 10,802,758 B2
(45) Date of Patent: Oct. 13, 2020

(54) MEMORY CONTROLLER MANAGING TEMPERATURE OF MEMORY DEVICE AND MEMORY SYSTEM HAVING THE MEMORY CONTROLLER

(71) Applicant: SK hynix Inc., Gyeonggi-do (KR)

(72) Inventor: Young Jae Jin, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/200,985

(22) Filed: Nov. 27, 2018

(65) Prior Publication Data

US 2019/0324690 A1 Oct. 24, 2019

(30) Foreign Application Priority Data

Apr. 19, 2018 (KR) .......................... 10-2018-0045717

(51) Int. Cl.
*G06F 3/06* (2006.01)

(52) U.S. Cl.
CPC .......... *G06F 3/0659* (2013.01); *G06F 3/0611* (2013.01); *G06F 3/0653* (2013.01); *G06F 3/0673* (2013.01)

(58) Field of Classification Search
CPC .... G06F 3/0611; G06F 3/0653; G06F 3/0659; G06F 3/0673; G06F 12/02
See application file for complete search history.

(56) References Cited

U.S. PATENT DOCUMENTS

| | | | | |
|---|---|---|---|---|
| 9,990,964 | B1* | 6/2018 | Lee | G11C 7/04 |
| 2006/0146629 | A1* | 7/2006 | Lee | G11C 5/04 |
| | | | | 365/222 |
| 2009/0091996 | A1* | 4/2009 | Chen | G11C 7/04 |
| | | | | 365/212 |
| 2010/0023678 | A1* | 1/2010 | Nakanishi | G06F 1/206 |
| | | | | 711/103 |
| 2016/0306592 | A1* | 10/2016 | Oh | G06F 3/0653 |
| 2017/0285944 | A1* | 10/2017 | Wang | G06F 3/061 |

FOREIGN PATENT DOCUMENTS

| | | |
|---|---|---|
| KR | 1020150046363 | 4/2015 |
| KR | 101573723 | 12/2015 |

* cited by examiner

*Primary Examiner* — Aracelis Ruiz
(74) *Attorney, Agent, or Firm* — IP & T Group LLP

(57) ABSTRACT

There are provided a memory controller and a memory system having the same. The memory controller includes: a temperature monitor device configured to count values that vary according to operation statuses of memory devices; a status check device configured to output status information of the memory devices based on the count values; and a scheduler configured to store the status information according to arrangements of the memory devices, and output the status information in response to a request received from a host.

18 Claims, 10 Drawing Sheets

FIG. 14

| HMD | MMD | LMD | CNT |
|---|---|---|---|
| HMD1 | MMD1 | LMD1 | CNT# |
| | | LMD2 | CNT# |
| | | LMD3 | CNT# |
| | | LMD4 | CNT# |
| | | LMD5 | CNT# |
| | | LMD6 | CNT# |
| | | LMD7 | CNT# |
| | | LMD8 | CNT# |
| | MMD2 | LMD1 | CNT# |
| | | LMD2 | CNT# |
| | | LMD3 | CNT# |
| | | LMD4 | CNT# |
| | | LMD5 | CNT# |
| | | LMD6 | CNT# |
| | | LMD7 | CNT# |
| | | LMD8 | CNT# |
| | MMD3 | LMD1 | CNT# |
| | | LMD2 | CNT# |
| | | LMD3 | CNT# |
| | | LMD4 | CNT# |
| | | LMD5 | CNT# |
| | | LMD6 | CNT# |
| | | LMD7 | CNT# |
| | | LMD8 | CNT# |
| | MMD4 | LMD1 | CNT# |
| | | LMD2 | CNT# |
| | | LMD3 | CNT# |
| | | LMD4 | CNT# |
| | | LMD5 | CNT# |
| | | LMD6 | CNT# |
| | | LMD7 | CNT# |
| | | LMD8 | CNT# |
| HMD2 | MMD1-4 | LMD1-4 | CNT# |
| HMD3 | MMD1-4 | LMD1-4 | CNT# |
| HMD4 | MMD1-4 | LMD1-4 | CNT# |

CNTIF ← → CNT

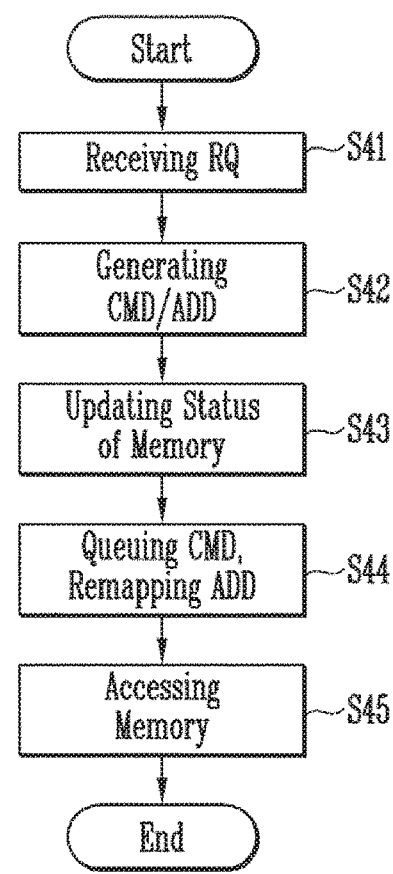

FIG. 15

Start → Receiving RQ (S41) → Generating CMD/ADD (S42) → Updating Status of Memory (S43) → Queuing CMD, Remapping ADD (S44) → Accessing Memory (S45) → End

MEMORY CONTROLLER MANAGING TEMPERATURE OF MEMORY DEVICE AND MEMORY SYSTEM HAVING THE MEMORY CONTROLLER

CROSS-REFERENCE TO RELATED APPLICATION

The present application claims priority under 35 U.S.C. § 119(a) to Korean patent application number 10-2018-0045717, filed on Apr. 19, 2018, the entire disclosure of which is incorporated herein by reference in its entirety.

BACKGROUND

1. Field of Invention

The present disclosure generally relates to a memory controller and a memory system having the same, and more particularly, to a memory controller for controlling access of a memory device, based on temperature information of the memory device, and a memory system having the memory controller.

2. Description of Related Art

A memory system may include a memory device for storing data and a memory controller for controlling the memory device.

The memory device may be a nonvolatile memory device in which data is retained even when the supply of power is interrupted or a volatile memory device in which data is lost when the supply of power is interrupted. The memory system may be implemented with a nonvolatile memory device or a volatile memory device according to the memory system.

The memory controller may communicate between a host and the memory device. For example, when a request is received from the host, the memory controller controls the memory device to execute the received request. When a program request is received from the host, the memory controller may generate a program command for controlling the memory device, and sequentially transmit the program command and data received from the host to the memory device. When a read request and a logical address are received from the host, the memory controller may generate a read command for controlling the memory device and then sequentially transmit the read command and a physical address corresponding to the logical address to the memory device.

The memory device may include many highly integrated cells to support a large capacity. However, a heat generation phenomenon may occur, in which the temperature in a specific area of the memory device is increased. Heat generation may cause degradation of the performance is and lifespan of the memory device, which results in deterioration of the reliability of the memory system.

SUMMARY

Embodiments provide a memory controller capable of suppressing a phenomenon in which the temperature in a specific area of a memory device is increased, and a memory system having the memory controller.

In accordance with an aspect of the present disclosure, there is provided a memory controller including: a temperature monitor device configured to count values varied according to operation statuses of memory devices; a status check device configured to output status information of the memory devices by calculating the count values; and a scheduler configured to store the status information according to various arrangements of the memory devices, and output the status information in response to a request received from a host.

In accordance with another aspect of the present disclosure, there is provided a memory controller including: a host interface configured to receive requests from a host, and output data read from memory devices to the host; and a command/address controller configured to update, in real time, temperature statuses of the memory devices, and access the memory devices by considering the temperature statuses when the requests are received.

In accordance with still another aspect of the present disclosure, there is provided a memory system including: memory devices configured to store data; and a memory controller configured to control the memory devices in response to requests received from a host, wherein the memory system includes a memory controller configured to store status information on temperature statuses of the memory devices and output the status information to the host.

In accordance with still another aspect of the present disclosure, there is provided a memory system including: a plurality of memory devices, each including a plurality of memory groups, each of which includes a plurality of memory elements, wherein the memory devices are stacked on each other, and wherein, for each memory device, the memory groups thereof are arranged adjacently on a surface of the corresponding memory device, and, for each memory group, the memory elements thereof are arranged adjacently on a surface of the corresponding memory group; and a memory controller suitable for: receiving an address and a command for accessing at least one of the memory devices, and generating temperature monitoring information for each of the memory elements, based on spatial arrangements of other memory elements with the corresponding memory element indicated by the address and the type of the command

BRIEF DESCRIPTION OF THE DRAWINGS

Various embodiments will now be described more fully with reference to the accompanying drawings; however, elements and features may be configured or arranged differently than disclosed herein. Thus, the present invention is not limited to the embodiments set forth herein. Rather, these embodiments are provided so that this disclosure is thorough and complete and fully conveys the scope of the embodiments to those skilled in the art. Also, throughout the specification, reference to "an embodiment" or the like is not necessarily to only one embodiment, and different references to any such phrase are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 14 is a diagram illustrating a temperature table in accordance with an embodiment of the present disclosure.

FIG. 15 is a flowchart illustrating an operating method in accordance with an embodiment of the present disclosure.

DETAILED DESCRIPTION

In the following detailed description, various embodiments of the present disclosure are shown and described, simply by way of example. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed. In addition, when an element is referred to as "including" a component, this indicates that the element may further include one or more other components instead of excluding such other component(s), unless the context indicates otherwise.

Figure 1:
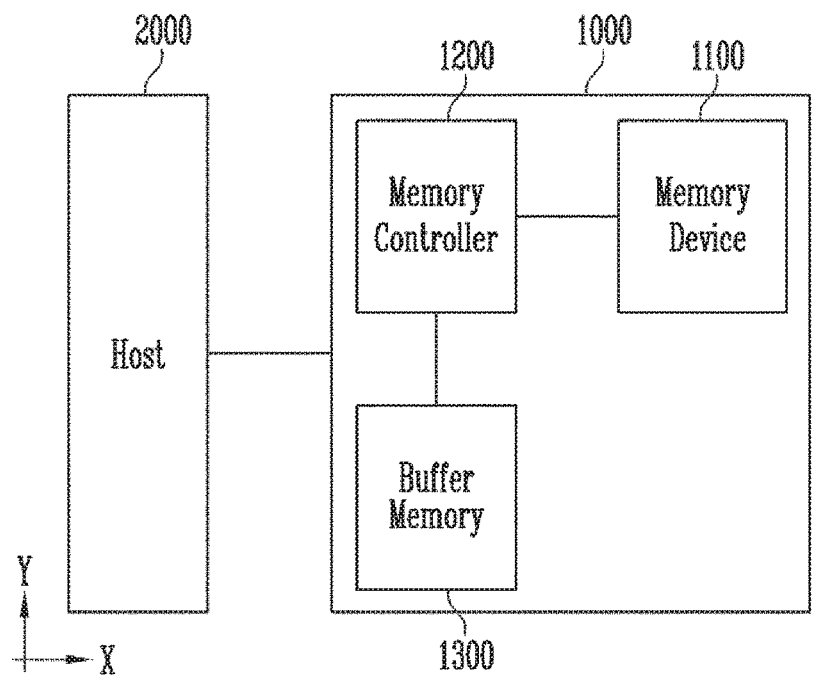
FIG. 1 is a diagram illustrating a memory system in accordance with an embodiment of the present disclosure.

FIG. 1 is a diagram illustrating a memory system 1000 in accordance with an embodiment of the present disclosure.

Referring to FIG. 1, the memory system 1000 may include a memory device 1100 for storing data and a memory controller 1200 for communicating between a host 2000 and the memory device 1100.

The memory device 1100 may be implemented with a nonvolatile memory device in which stored data is retained even when the supply of power is interrupted or a volatile memory device in which stored data is lost when the supply of power is interrupted.

The memory device 1100 may include a plurality of memory cells for storing data, and the memory cells may be divided in units of various groups. For example, the memory device 1100 includes at least one high level memory device, which includes at least one middle level memory device, which includes at least one low level memory device. A plurality of memory cells may be included in the low level memory device. Therefore, the high level memory device, the middle level memory device, and the low level memory device may be distinguished and managed by different addresses.

The high level memory device, the middle level memory device, and the low level memory device are names for distinguishing storage areas within the memory device 1100. However, in addition to the above-described names, the name of a storage area may be expressed as a rank, a bank, a bank group, a slice, a channel, a plane, a block, or the like. Thus, although the terms high level memory device, middle level memory device, and low level memory device are described in embodiments, the names of the storage areas are not limited thereto. The high level memory device, the middle level memory device, and the low level memory device will be described later.

The memory controller 1200 may control overall operations of the memory system 1000, and control data exchange between the host 2000 and the memory device 1100. For example, the memory controller 1200 programs or reads data by controlling the memory device 1100 in response to a request from the host 2000.

A buffer memory 1300 may be further included in the memory system 1000. The buffer memory 1300 may control data exchange between the host 2000 and the memory device 1100 or temporarily store system data for controlling the memory device 1100. For example, the buffer memory 1300 is used as a working memory or cache memory of the memory controller 1200. Also, the buffer memory 1300 may temporarily store codes and commands, which are executed by the memory controller 1200.

The memory controller 1200 may temporarily store data received from the host 2000 in the buffer memory 1300 and then transmit the data temporarily stored in the buffer memory 1300 to the memory device 1100 to be stored in the memory device 1100. Also, the memory controller 1200 may receive data and a logical address from the host 2000, and translate the logical address into a physical address of the memory device 1100. Also, the memory controller 1200 may store, in the buffer memory 1300, logical-to-physical address mapping information that establishes a mapping relationship between the logical address and the physical address.

In some embodiments, the buffer memory 1300 may include a double data rate synchronous dynamic random access memory (DDR SDRAM), a DDR4 SDRAM, a low power double data rate 4 (LPDDR4) SDRAM, a graphics double data rate (DDDR) SRAM, a low power DDR (LPDDR), and a Rambus dynamic random access memory (RDRAM).

The memory device 1100, the memory controller 1200, and the buffer memory 1300 may be arranged adjacent to each other along a plane defined by a first direction X and a second direction Y. The first direction X and the second direction Y may be orthogonal to each other.

The host 2000 may communicate with the memory system 1000 by using at least one of various communication schemes such as a universal serial bus (USB), a serial AT attachment (SATA), a serial attached SCSI (SAS), a high speed intership (HSIC), a small computer system interface (SCSI), a peripheral component interconnection (PCI), a PCI express (PCIe), a non-volatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
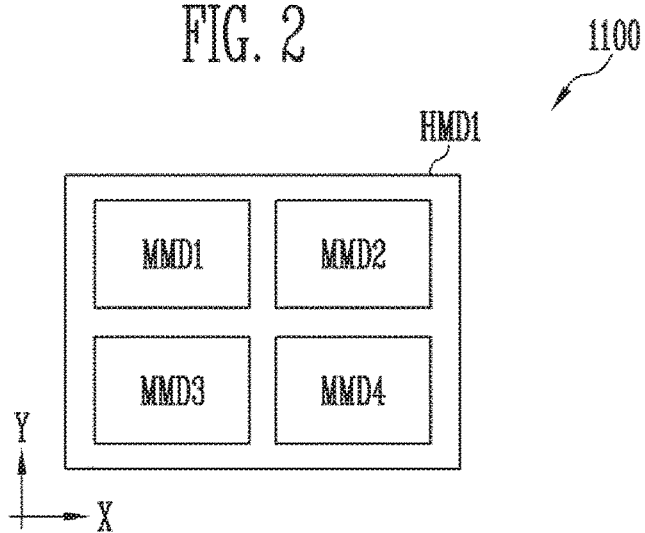
FIG. 2 is a diagram illustrating a memory device in accordance with an embodiment of the present disclosure.

FIG. 2 is a diagram illustrating a memory device in accordance with an embodiment of the present disclosure, for example, the memory device 1100 of FIG. 1.

Referring to FIG. 2, the memory device 1100 may include at least one high level memory device HMD. In an embodiment, a first high level memory device HMD1 is illustrated in FIG. 2.

The first high level memory device HMD1 may include at least one middle level memory device MMD. In an embodiment, first to fourth middle level memory devices MMD1 to MMD4 included in the first high level memory device HMD1 are illustrated in FIG. 2. However, the number of middle level memory devices MMD included in one high level memory device HMD may be changed depending on the memory device 1100. Different physical addresses may be designated to the first to fourth middle level memory devices MMD1 to MMD4.

The first to fourth middle level memory devices MMD1 to MMD4 may be arranged adjacent to each other along a plane defined by the first direction X and the second direction Y.

Figure 3:
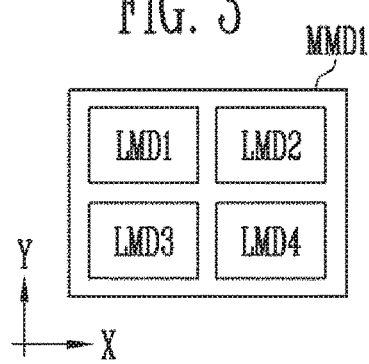
FIG. 3 is a diagram illustrating a middle level memory device in accordance with an embodiment of the present disclosure.

FIG. 3 is a diagram illustrating a middle level memory device in accordance with an embodiment of the present disclosure, for example, the middle level memory device of FIG. 2.

Referring to FIG. 3, the middle level memory device MMD may include at least one low level memory device LMD. In an embodiment, first to fourth low level memory devices LMD1 to LMD4 included in the first middle level memory device MMD1 are illustrated in FIG. 3. However, the number of low level memory devices LMD included in one middle level is memory device MMD may be changed depending on the memory device 1100. Different physical addresses may be designated to the first to fourth low level memory devices LMD1 to LMD4.

The low level memory device LMD may include a plurality of memory cells and a peripheral circuit for performing a program, read or erase operation on the memory cells. Also, the low level memory device LMD may include a plurality of groups of memory cells, which are designated by different physical addresses.

The first to fourth low level memory devices LMD1 to LMD4 may be arranged adjacent to each other along a plane defined by the first direction X and the second direction Y.

Figure 4:
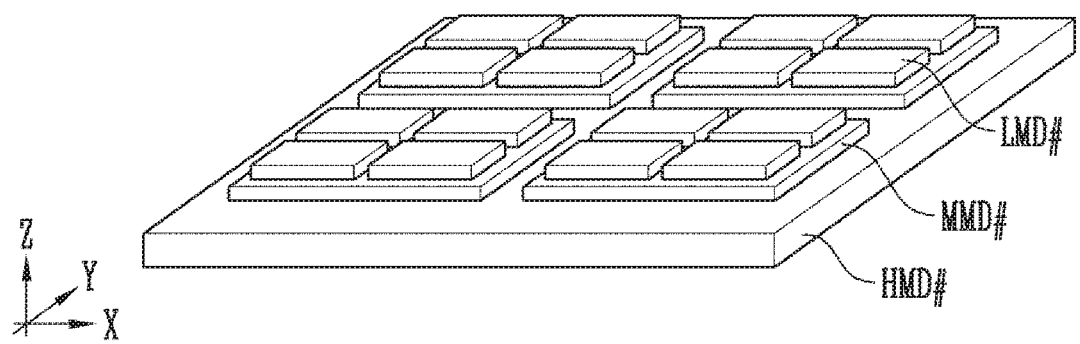
FIG. 4 is a perspective view illustrating high level memory devices, middle level memory devices, and low level memory devices.

FIG. 4 is a perspective view illustrating an exemplary arrangement of a high level memory device, middle level memory devices, and low level memory devices.

Referring to FIG. 4, middle level memory devices MMD # (where # is a positive integer) may be arranged in parallel to each other on the top of their associated high level memory device HMD #, and low level memory devices LMD # may be arranged in parallel to each other on the top of each of the middle level memory devices MMD #. For example, the high level memory device HMD #, the middle level memory devices MMD #, and the low level memory devices LMD # are stacked along a third direction Z vertical to the first and second directions X and Y, the middle level memory devices MMD # may be arranged in parallel to each other along the first and second directions X and Y, and the low level memory devices LMD # may be arranged in parallel to each other along the first and second directions X and Y.

Figure 5:
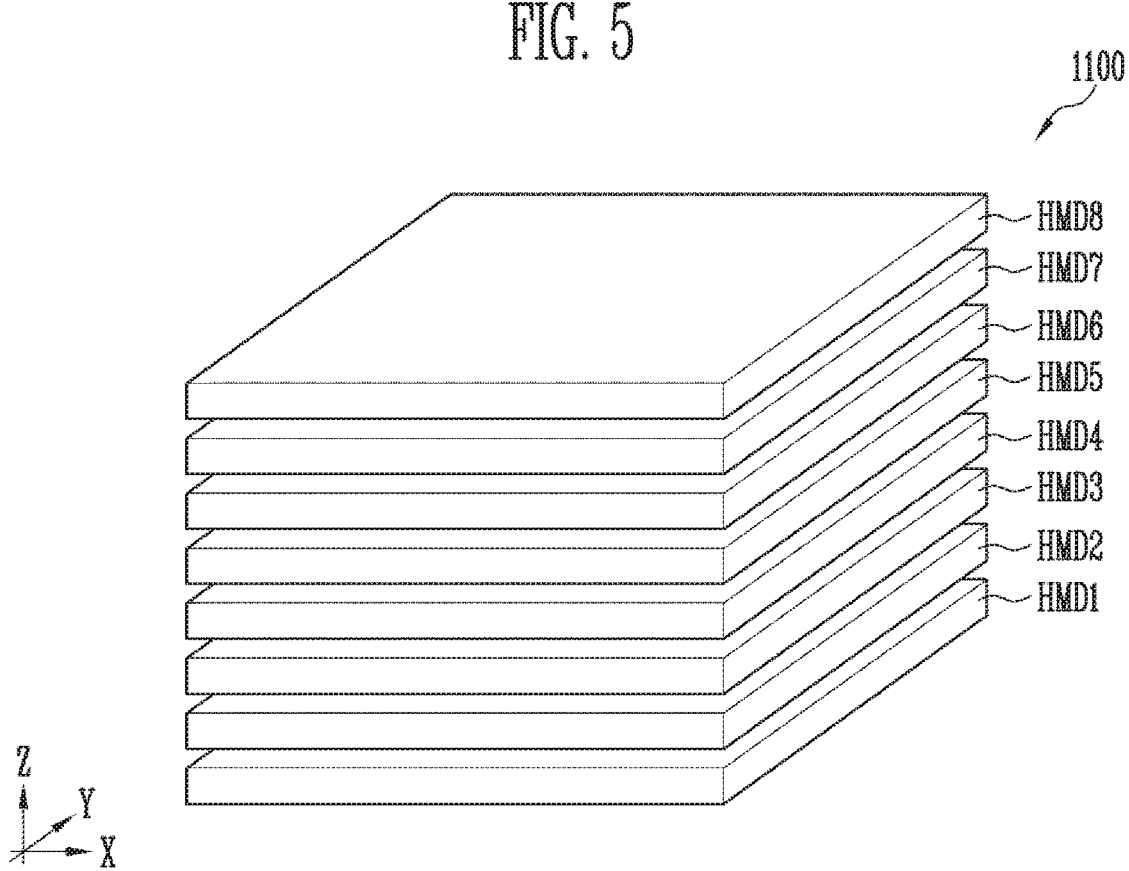
FIG. 5 is a perspective view illustrating a memory device having a multi-stack structure in accordance with an embodiment of the present disclosure.

FIG. 5 is a perspective view illustrating a memory device having a multi-stack structure in accordance with an embodiment of the present disclosure.

Referring to FIG. 5, the memory device 1100 having the multi-stack structure may include a plurality of high level memory devices HMD stacked on each other. In an embodiment, a structure in which first to eighth high level memory devices HMD1 to HMD8 are stacked is illustrated in FIG. 5. In addition, the middle level memory devices MMD # and the low level memory devices LMD #, which are shown in FIG. 4, are included in each of the first to eighth high level memory devices HMD1 to HMD8. However, in FIG. 5, the middle level memory devices MMD # and the low level memory devices LMD # are omitted to illustrate a structure in which eight high level memory devices HMD1 to HMD8 are stacked on each other along the third direction Z.

A structure in which a plurality of high level memory devices HMD # are stacked may be referred to as the multi-stack structure, and the middle level memory devices MMD # and the low level memory devices LMD # may also be stacked along the third direction Z.

As described above, when the high level, middle level, and low level memory devices HMD #, MMD #, and LMD # are densely arranged, the degree of integration of the memory device 1100 is increased. Hence, the size of the memory device 1100 may be decreased, and the capacity of the memory device 1100 may be increased. However, the distance or margin between the high level, middle level, and low level memory devices HMD #, MMD #, and LMD # may be decreased due to high degree of integration. Therefore, a heat generation phenomenon may occur, in which when a specific operation is performed, the temperature in a specific area is increased.

In this embodiment, in order to suppress the heat generation phenomenon, a command may be queued or a memory device to be accessed may be changed, based on temperature statuses of memory devices, which are monitored in real time. Also, in this embodiment, the memory controller may update the temperature statuses of the memory devices according to a number of times of accessing to a memory device and an operation performed in the memory device.

To this end, the memory controller 1200 will be described in detail as follows.

Figure 6:
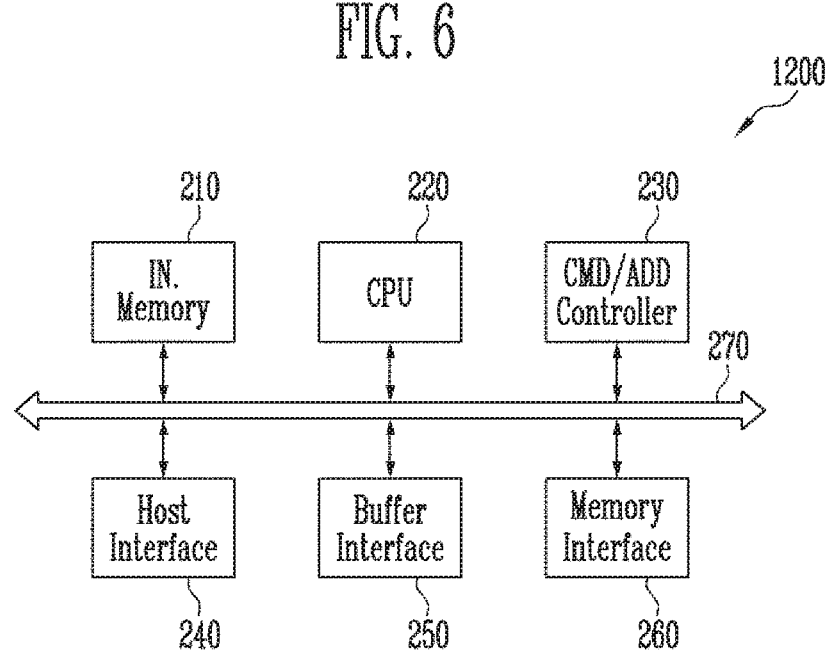
FIG. 6 is a diagram illustrating a memory controller in accordance with an embodiment of the present disclosure.

FIG. 6 is a diagram illustrating a memory controller in accordance with an embodiment of the present disclosure, for example, the memory controller 1200 of FIG. 1.

Referring to FIG. 6, the memory controller 1200 may include an internal (IN.) memory 210, a central processing unit (CPU) 220, a command/address (CMD/ADD) controller 230, a host interface 240, a buffer interface 250, and a memory interface 260.

The internal memory 210 may store various system information necessary for an operation of the memory controller 1200. In addition, the internal memory 210 may store address mapping information, debugging information, and the like, which are necessary for an operation of the memory system 1000. For example, the internal memory 210 is implemented with a static random access memory (SRAM).

The CPU 220 may perform various operations for controlling the memory device 1100 or run firmware. The CPU 220 may transmit a request received from the host 2000 to the CMD/ADD controller 230. The CPU 220 may control overall operations of the internal memory 210, the CMD/ADD controller 230, the host interface 240, the buffer interface 250, and the memory interface 260.

The CMD/ADD controller 230 may update, in real time, a temperature status of the memory device 1100 according to a command executed in the memory device 1100, and control access of high level, middle level, and low level memory devices included in the memory device 1100.

The host interface 240 may communicate with the host 2000 coupled to the memory system 1000 under the control of the CPU 220. For example, the host interface 240 receives a program, read or erase request and data from the host 2000, and outputs data read from the memory device 1100 to the host 2000.

When the buffer memory 1300 is disposed at the outside of the memory controller 1200, the buffer interface 250 may transmit information to the buffer memory 1300 under the control of the CPU 220, or transmit information stored in the buffer memory 1300 to the CPU 220.

The memory interface 260 may communicate with the memory device 1100 under the control of the CPU 220. For example, the memory interface 260 transmits a command, an address, and data to the memory device 1100 under the control of the CPU 220, and transmits data read from the memory device 1100 to the CPU 220.

The CPU 220 may transmit data between the internal memory 210, the CMD/ADD controller 230, the host interface 240, the buffer interface 250, and the memory interface 260 through a bus 270. In some embodiments, the CMD/ADD controller 230, the host interface 240, and the memory interface 260 may independently communicate with each other without passing through the bus 270. For example, the CMD/ADD controller 230 and the host interface 240 directly communicate with each other without passing through the bus 270, the CMD/ADD controller 230 and the memory interface 260 directly communicate with each other without passing through the bus 270, and the host interface 240 and the memory interface 260 directly communicate with each other without passing through the bus 270.

Figure 7:
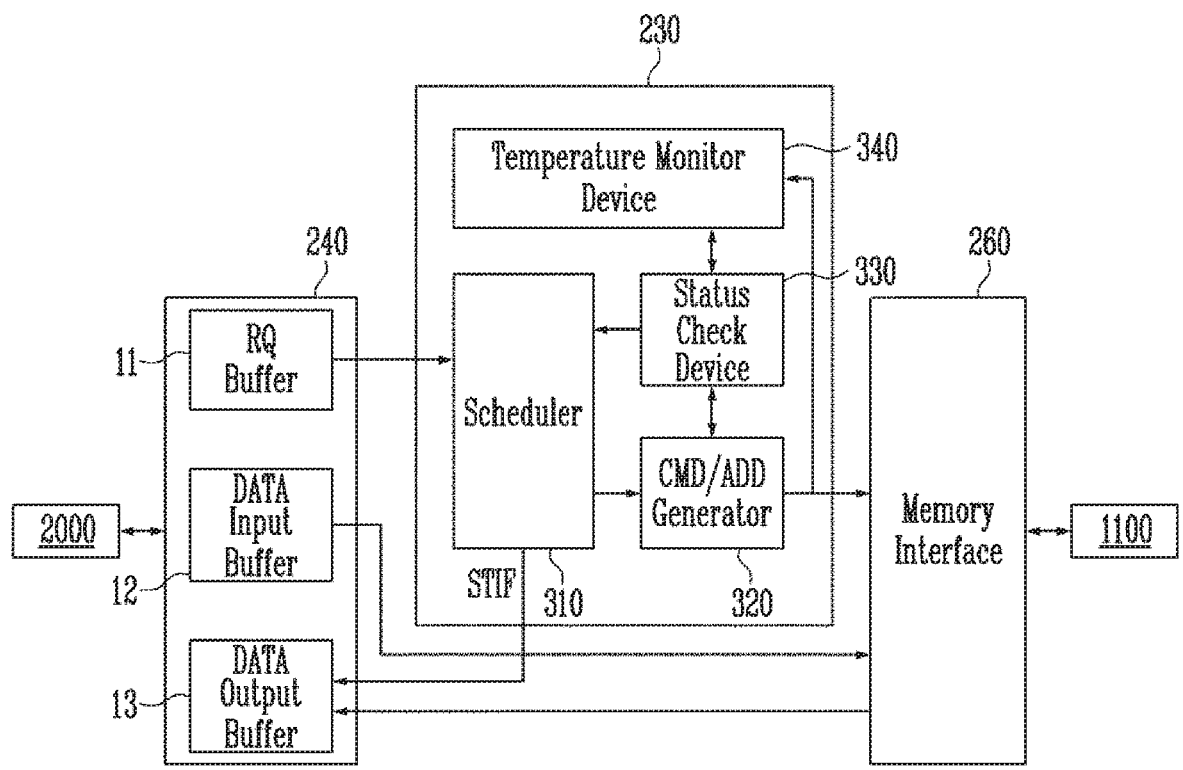
FIG. 7 is a diagram illustrating a command and address controller and a host interface in accordance with an embodiment of the present disclosure.

FIG. 7 is a diagram illustrating a command and address controller and a host interface in accordance with an embodiment of the present disclosure, for example, the CMD/ADD controller 230 and the host interface 240 of FIG. 6.

Referring to FIG. 7, the CMD/ADD controller 230 may update, in real time, a temperature status of the memory device 1100. Also, when a request is received from the host 2000, the CMD/ADD controller 230 may generate a command corresponding to the request, and transmit the command to the memory device 1100 through the memory interface 260 by scheduling the command according to the temperature status of the memory device 1100. That is, the CMD/ADD controller 230 may control access of the memory device 1100 according to the temperature status of the memory device 1100.

The host interface 240 may include a request (RQ) buffer 11, a data input buffer 12, and a data output buffer 13.

The RQ buffer 11 may receive requests from the host 2000 to temporarily store the received requests, and sequentially transmit the received requests to the memory controller 1200. For example, the RQ buffer 11 may sequentially transmit the temporarily stored requests to the CMD/ADD controller 230 under the control of the CPU 220.

The data input buffer 12 may temporarily store data received from the host 2000, and transmit the data to the memory interface 260 under the control of the CPU 220. For example, in a program operation, data received from the host 2000 is temporarily stored in the data input buffer 12.

The data output buffer 13 may temporarily store data received from the memory interface 260, and output the received data to the host 2000 under the control of the CPU 220. For example, in a read operation, data read from the memory device 1100 is received through the memory interface 260. When data is transmitted from the memory interface 260 to the data output buffer 13, the data output buffer 13 may output the data to the host 2000. Also, the data output buffer 13 may output status information STIF of the memory device 1100, which is received from a scheduler 310 of the CMD/ADD controller 230, to the host 2000.

The CMD/ADD controller 230 may include the scheduler 310, a CMD/ADD generator 320, a status check device 330, and a temperature monitor device 340.

The scheduler 310 may receive status information STIF of the memory device 1100 from the status check device 330, and queue requests received from the RQ buffer 11, based on the status information STIF. An operation command and a logical address may be included in the request received from the host 2000. Also, the scheduler 310 may output the stored status information STIF to the data output buffer 13 in response to the request of the host 2000, and the data output buffer 13 may output the status information STIF to the host 2000. The host 2000 may monitor a temperature status of the memory device 1100, based on the received status information STIF.

The CMD/ADD generator 320 may receive requests from the scheduler 310, generate a command and a physical address, which respectively correspond to the requests, and simultaneously transmit the generated command and the generated physical address to the memory interface 260 and the temperature monitor device 340. The physical address may be received from a map table stored in the buffer memory 1300 of FIG. 1. Also, the CMD/ADD generator 320 may transmit the physical address to the status check device 330 before the command and the physical address are output, and output the command and the physical address after it is checked whether the physical address is in a state in which it is accessible.

The status check device 330 may update, in real time, a check value of a physical address, and output the check value of a physical address to be accessed. Also, the status check device 330 may receive temperature information from the temperature monitor device 340, calculate a temperature influence value between storage devices corresponding to the physical address, based on the temperature information, and output the temperature influence value as status information.

The temperature monitor device 340 may update, in real time, count information according to the command and the physical address, which are received from the CMD/ADD generator 320. The updated count information of the physical address may be transmitted to the status check device 330.

Figure 8:
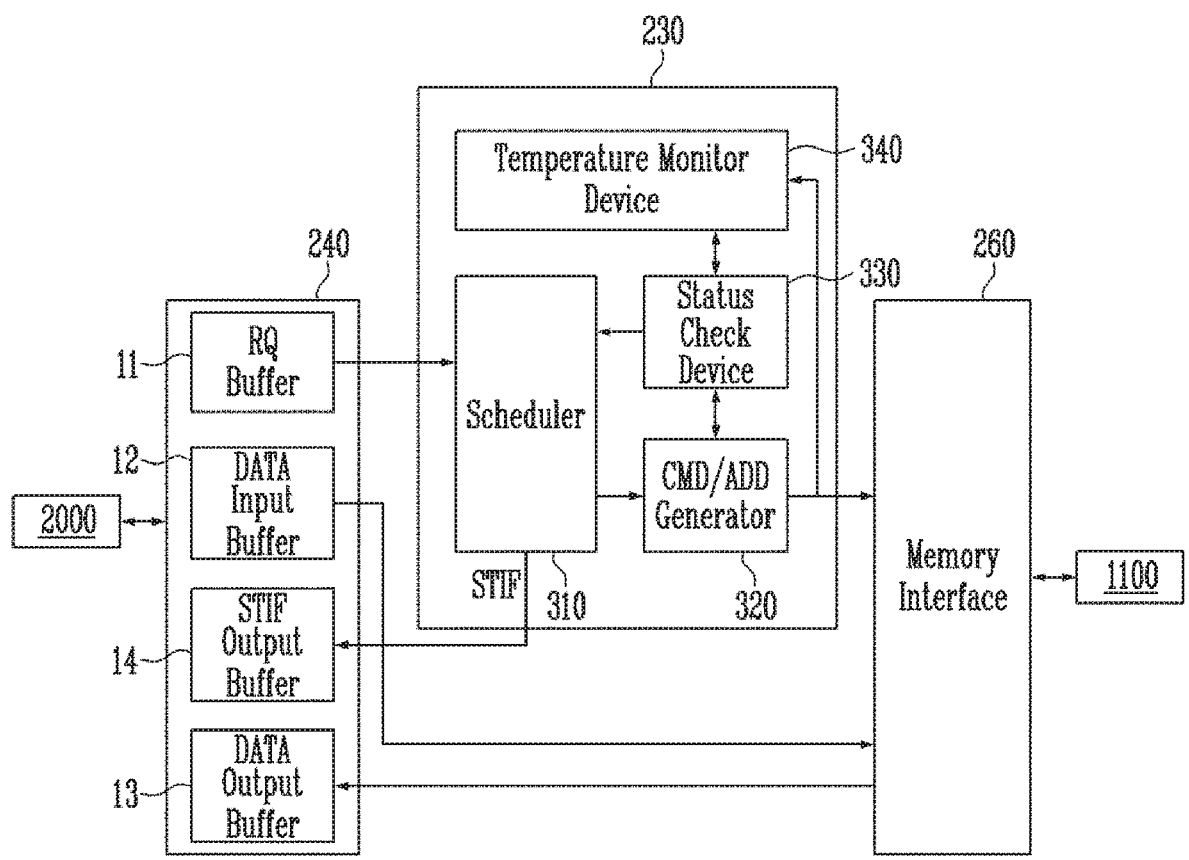
FIG. 8 is a diagram illustrating another command and address controller in accordance with an embodiment of the present disclosure.

FIG. 8 is a diagram illustrating a command and address controller and a host interface in accordance with an embodiment of the present disclosure, for example, the CMD/ADD controller 230 and the host interface 240 of FIG. 6.

The CMD/ADD controller 230 shown in FIG. 8 has the same configuration as that described in connection with FIG. 7 except the former includes a host interface 240. Therefore, description of common components is omitted below.

Referring to FIG. 8, the host interface 240 may further include a status information (STIF) output buffer 14. The status information output buffer 14 may receive status information STIF of the memory device 1100 from the scheduler 310, and output the received status information STIF to the host 2000. The data output buffer 13 may output only data received from the memory interface 260 to the host 2000.

When the status information output buffer 14 outputs status information STIF to the host 2000, the data output buffer 13 outputs data to the host 2000 regardless of the status information STIF, so that the operation time of the memory controller 1200 may be reduced.

The configuration of the CMD/ADD controller 230 described in FIG. 7 or 8 will be described in detail as follows.

Figure 9:
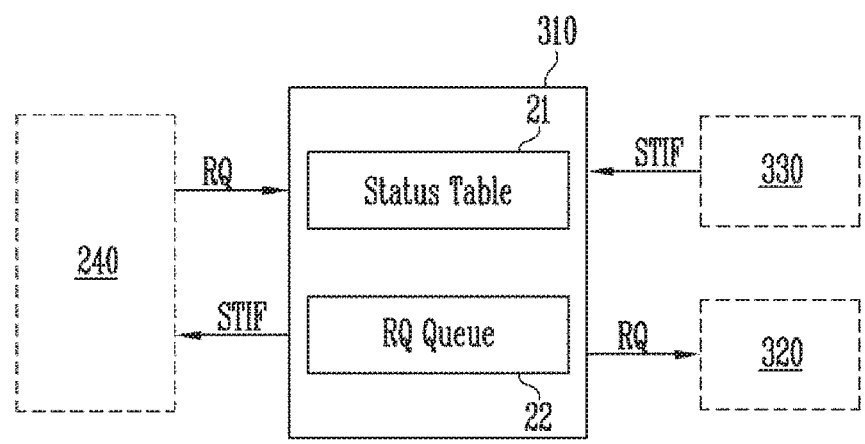
FIG. 9 is a diagram illustrating a scheduler in accordance with an embodiment of the present disclosure.

FIG. 9 is a diagram illustrating a scheduler in accordance with an embodiment of the present disclosure, for example, the scheduler 310 of FIG. 7 or 8.

Referring to FIG. 9, the scheduler 310 may include a status table 21 for storing status information STIF and a request (RQ) queue 22. The RQ queue 22 may queue an output order of a request RQ with reference to the status table 21. The scheduler 310 may receive and store status information STIF corresponding to a logical address from the status check device 330 in the status table 21. Further, the scheduler 310 may queue, based on the status information SFIF in the status table 21, the request RQ in the RQ queue 22 such that heat generated in the memory device 1100 is not increased or that the temperature of the memory device 1100 is distributed, by comparing a logical address included in a request RQ received from the host interface 240 with an arbitrary address to be compared with the logical address.

A number of cases or situations subject to various degrees of temperature influence stored in the status table 21. The number of cases to include may be different depending on specific structural details of the memory devices. An embodiment of various temperature influences is illustrated in FIG. 10.

Figure 10:
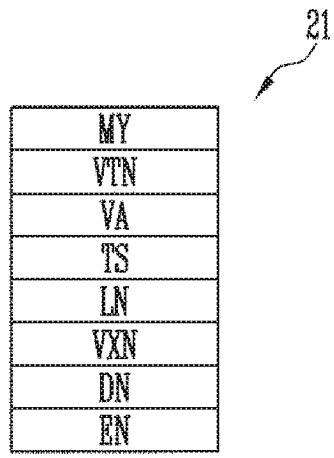
FIG. 10 is a diagram illustrating information stored in a status table in accordance with an embodiment of the present disclosure.

FIG. 10 is a diagram illustrating information stored in a status table in accordance with an embodiment of the present disclosure, for example, the status table 21 of FIG. 9.

Referring to FIG. 10, temperature influences with respect to various cases may be stored as data in the status table 21. The temperature influences may be different according to current statuses of memory devices and the request RQ received from the host interface 240. For example, the temperature influences are different according to whether memory cells indicated by an address selected by the request RQ and an arbitrary address to be compared are physically stacked on each other or are parallel to each other. The memory cell indicated by each address may correspond to one memory cell or a plurality of memory cells. In addition, the temperature influences may be different according to how much the physical distance between the memory cells indicated by the address selected by the request RQ and the arbitrary address to be compared is.

In the status table 21, 'MY' means a case where the memory cells indicated by the requested address and the address to be compared are the same. 'VTN' in the status table 21 means a case where the memory cells indicated by the requested address and the address to be compared are physically and vertically arranged adjacent to each other. The temperature influence with respect to the case of 'VTN' may be largest as compared with other cases. 'VA' in the status table 21 means a case where the memory cells indicated by the requested address and the address to be compared are physically and vertically arranged but are not arranged adjacent to each other. Therefore, the case of 'VA' may be less influenced by temperature than the case of 'VTN.' 'TS' in the status table 21 means a case where the memory cells indicated by the requested address and the address to be compared are hardly influenced by temperature. For example, 'TS' is a case where the memory cells indicated by the requested address and the address to be compared are physically vertically arranged but are respectively arranged at the uppermost end and the lower most end.

'LN' in the status table 21 may be a case where the memory cells indicated by the requested address and the address to be compared are physically and horizontally arranged but are arranged adjacent to each other. This case may be one in which the memory cells indicated by the requested address and the address to be compared are horizontally most influenced by temperature. 'VXN' in the status table 21 may be a case where the memory cells indicated by the requested address and the address to be compared are physically and horizontally arranged but are arranged in a diagonal direction. Therefore, the case of 'VXN' may be less influenced by temperature than the case of 'LN.'

'DN' in the status table 21 may be a case where the memory cells indicated by the requested address and the address to be compared have physical positions vertically and horizontally symmetrical to each other. 'EN' in the status table 21 may be a case where the memory cells indicated by the requested address and the address to be compared are physically and vertically arranged but are symmetrical to each other on the same row. In the case of 'EN,' the distance between the physical positions of the memory cells indicated by the requested address and the address to be compared is short as compared with the case of 'DN,' and therefore, the temperature influence of the case of 'EN' may be larger than that of the case of 'DN.'

Data about temperature influences with respect to various other cases, in addition to the above-described cases, may be stored in the status table 21. In general, when the number of memory devices or the number of physical addresses increases, the number of cases stored in the status table 21 may increase.

Referring back to FIG. 9, the RQ queue 22 may select, with reference to the status table 21, a case where the temperature influence of the memory device 1100 is small, and queue a request RQ according to the selected case. Subsequently, the RQ queue 22 may transmit the queued request RQ to the CMD/ADD generator 320.

The status information STIF stored in the scheduler 310 may be output to the host interface 240, and the host interface 240 may output the received status information STIF to the host 2000.

Figure 11:
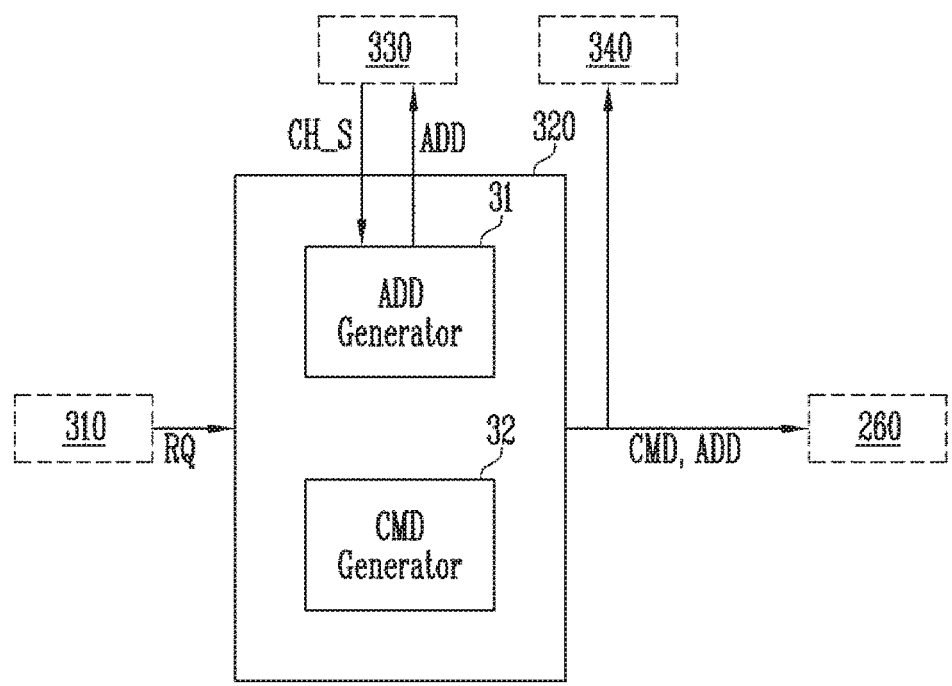
FIG. 11 is a diagram illustrating a command and address generator in accordance with an embodiment of the present disclosure.

FIG. 11 is a diagram illustrating a command and address generator in accordance with an embodiment of the present disclosure, for example, the CMD/ADD generator 320 of FIG. 7 or 8.

Referring to FIG. 11, the CMD/ADD generator 320 may include an address (ADD) generator 31 and a command (CMD) generator 32.

The ADD generator 31 may generate a physical address corresponding to the logical address included in the request RQ. The CMD generator 32 may generate a command CMD corresponding to the command in the request RQ 22 of the scheduler 310 in FIG. 9. For example, the ADD generator 31 receives a physical address corresponding to the logical address from a map address stored in the buffer memory 1300 of FIG. 1. When a physical address ADD corresponding to the logical address is received, the ADD generator 31 may transmit the physical address ADD to the status check device 330 and receive a check signal CH_S from the status check device 330. The ADD generator 31 may output the command CMD and the physical address ADD to the memory interface 260 in response to the check signal CH_S from the status check device 330. For example, when the check signal CH_S is activated, the ADD generator 31 and the CMD generator 32 respectively output the physical address ADD and the command CMD to the memory interface 260. When the check signal CH_S is inactivated, the ADD generator 31 and the CMD generator 32 do not output the physical address ADD and the command CMD, respectively. The check signal CH_S may be activated when the average temperature of the memory device 1100 is lower than a threshold temperature. The check signal CH_S may be inactivated when the average temperature of the memory device 1100 is higher than the threshold temperature.

The command CMD and the physical address ADD, which are output from the CMD/ADD generator 320, may be transferred to the temperature monitor device 340 so as to update the temperature status of the memory device 1100.

Figure 12:
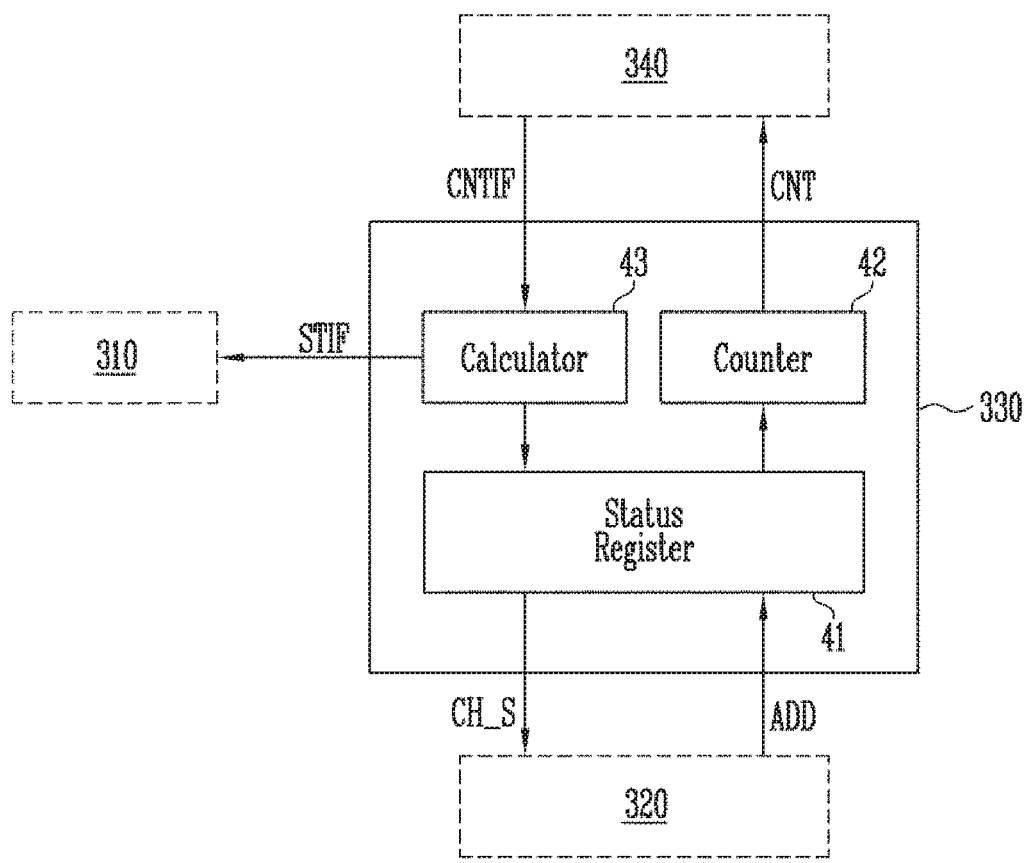
FIG. 12 is a diagram illustrating a status check device in accordance with an embodiment of the present disclosure.

FIG. 12 is a diagram illustrating a status check device in accordance with an embodiment of the present disclosure, for example, the status check device 330 of FIG. 7 or 8.

Referring to FIG. 12, the status check device 330 may include a status register 41, a counter 42, and a calculator 43.

The status register 41 may store status values of memory devices, and output the check signal CH_S, based on a status value corresponding to the physical address ADD received from the CMD/ADD generator 320. When the average temperature of the memory device 1100 is lower than the threshold temperature, the status register 41 may activate the check signal CH_S. When the average temperature of the memory device 1100 is higher than the threshold temperature, the status register 41 may inactivate the check signal CH_S. Also, when the physical address ADD is received, the status register 41 may transmit an address reception signal to the counter 42.

The counter 42 may output a count value CNT whenever the address reception signal is received from the status register 41. When the address reception signal is received within a certain time, the counter 42 may increase the count value CNT. When the address reception signal is not received within the certain time, the counter 42 may decrease the count value CNT. That is, the counter 42 may increase the count value CNT of a memory device in which an operation is consecutively performed, and decrease the count value CNT of a memory device in which an operation is not performed or an idle state is continued.

The calculator 43 may receive count information CNTIF, and may output status information STIF by adding up count values for the respective addresses. Specifically, the calculator 43 may generate a count value of each of the high level memory devices, a count value of each of the middle level memory devices, and a count value of each of the low level memory devices from the count values of all of the high level, middle level, and low level memory devices included in the count information CNTIF. Then, the calculator 43 may match the generated count values to the respective addresses, and output the matched count values as the status information STIF.

Figure 13:
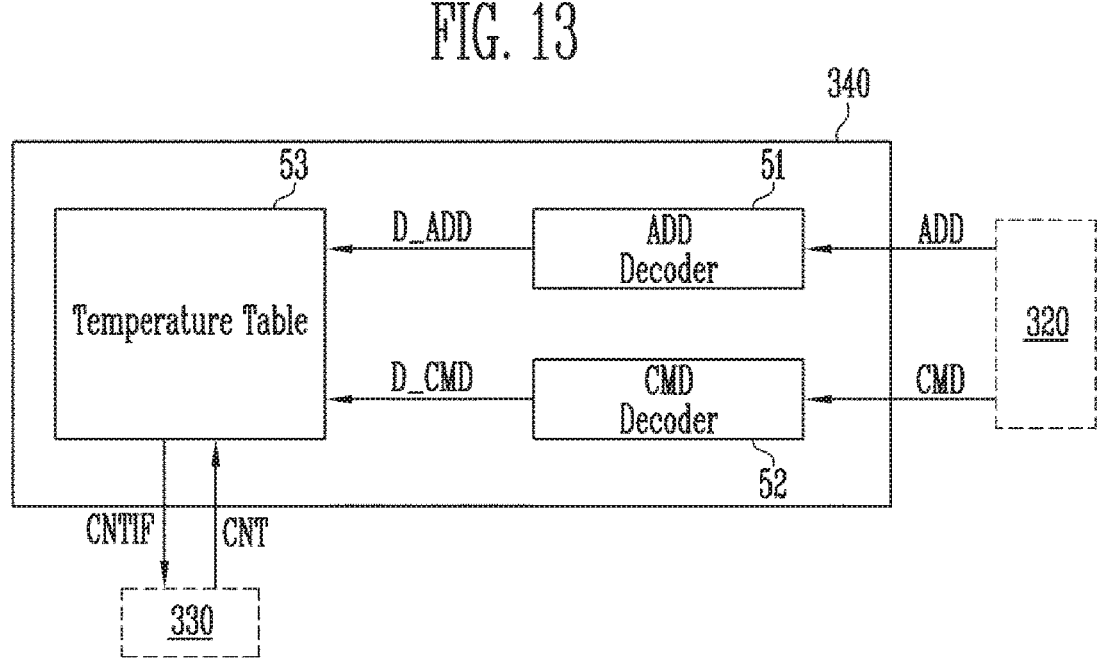
FIG. 13 is a diagram illustrating a temperature monitor device in accordance with an embodiment of the present disclosure.

FIG. 13 is a diagram illustrating a temperature monitor device in accordance with an embodiment of the present disclosure, for example, the temperature monitor device 340 of FIG. 7 or 8.

Referring to FIG. 13, the temperature monitor device 340 may include an address (ADD) decoder 51, a command (CMD) decoder 52, and a temperature table 53.

The ADD decoder 51 may decode a physical address ADD received from the CMD/ADD generator 320 and output the decoded physical address ADD as a decoded address D_ADD. The decoded address D_ADD may be an address for distinguishing upper level, middle level, and low level memory devices from one another. That is, the ADD decoder may decode the physical address ADD transmitted to the memory device 1100 as an address to be managed in the temperature table 53.

The CMD decoder 52 may decode a command CMD received from the CMD/ADD generator 320 and output the decoded command CMD as a decoded command D_CMD. The decoded command D_CMD may be a command for distinguishing different operations from one another. That is, the CMD decoder 52 may decode the command CMD to the memory device 1100 as a command to be managed in the temperature table 53.

The temperature table 53 may update a count value for each address according to the decoded address D_ADD, the decoded command D_CMD, and the count value CNT. An embodiment of the temperature table 53 is illustrated in FIG. 14.

FIG. 14 is a diagram illustrating a temperature table in accordance with an embodiment of the present disclosure, for example, the temperature table 53 of FIG. 13.

Referring to FIG. 14, the temperature table 53 may store count values CNT of high level, middle level, and low level memory devices HMD, MMD, and LMD in the memory device 1100. The temperature table 53 may receive the decoded addresses D_ADD and the decoded commands D_CMD from the ADD decoder 51 and the CMD decoder 52, respectively, and receive the count values CNT from the status check device 330. For example, the decoded addresses D_ADD may include addresses of the high level, middle level, and low level memory devices HMD, MMD, and LMD. The temperature table 53 may update a count value for each address according to the decoded address D_ADD. Each of the count values may be increased according to the count value CNT received from the status check device 330.

FIG. 14 shows that first to fourth high level memory devices HMD1 to HMD4 are included in the memory device 1100, first to fourth middle level memory devices MMD1 to MMD4 are included in each of the first to fourth high level memory devices HMD1 to HMD4, and first to eighth low level memory devices LMD1 to LMD8 are included in each of the first to fourth middle level memory devices MMD1 to MMD4. The following discussion is also based on this arrangement.

The count value CNT corresponding to each of the eight low level memory devices LMD1 to LMD8 may be updated.

For example, the count value CNT of the first low level memory device LMD1 of the first middle level memory device MMD1 of the first high level memory device HMD1 is increased according to the decoded command D_CMD. That is, the decoded address D_ADD may select an address to be updated, and the degree of heat generation of the address to be updated may be determined according to the decoded command D_CMD. For example, assuming that the degree of heat generation in a program operation is greater than that in a read operation, the count value CNT may be increased relatively more when the decoded command D_CMD is a command corresponding to the program operation, and be increased relatively less when the decoded command D_CMD is a command corresponding to the read operation.

When count information CNTIF on each memory device is output from the temperature table 53, the calculator 43 of FIG. 12 may calculate a count value of the first middle level memory device MMD1 by adding up all count values CNT # of the first to eighth low level memory devices LMD1 to LMD8. Further, the calculator 43 may calculate a count value of the first high level memory device HMD1 by adding up all count values CNT # of the first to fourth middle level memory devices MMD1 to MMD4. When the added-up count value of corresponding memory devices, that is, associated low level, middle level and high level memory devices, is increased, it indicates that the temperature of the corresponding memory devices is increased.

FIG. 15 is a flowchart illustrating an operating method in accordance with an embodiment of the present disclosure.

Referring to FIG. 15, the operating method using the devices described in FIGS. 7 to 14.

When a request RQ is received from the host 2000 (S41), the memory controller 1200 may process the received request RQ. Specifically, the scheduler 310 of FIG. 8 may schedule the request RQ, and that request RQ may be transmitted to the CMD/ADD generator 320 of FIG. 7 or 8. As described in FIG. 9, the scheduler 310 may determine a case where heat generation is low by comparing a requested address with an address to be compared, queue the request RQ according to the determined case, and transmit the queued request RQ to the CMD/ADD generator 320.

The CMD/ADD generator 320 may generate a command CMD and a physical address ADD in response to the received request RQ (542), When the command CMD and the physical address ADD are received from the CMD/ADD generator 320, the scheduler 310 may update status information corresponding to the corresponding physical address (S43).

After the command CMD is again queued or the physical address ADD is again mapped according to the updated status information (S44), the memory controller 1200 may access the memory device 1100 according to the mapped address (S45).

Figure 16:
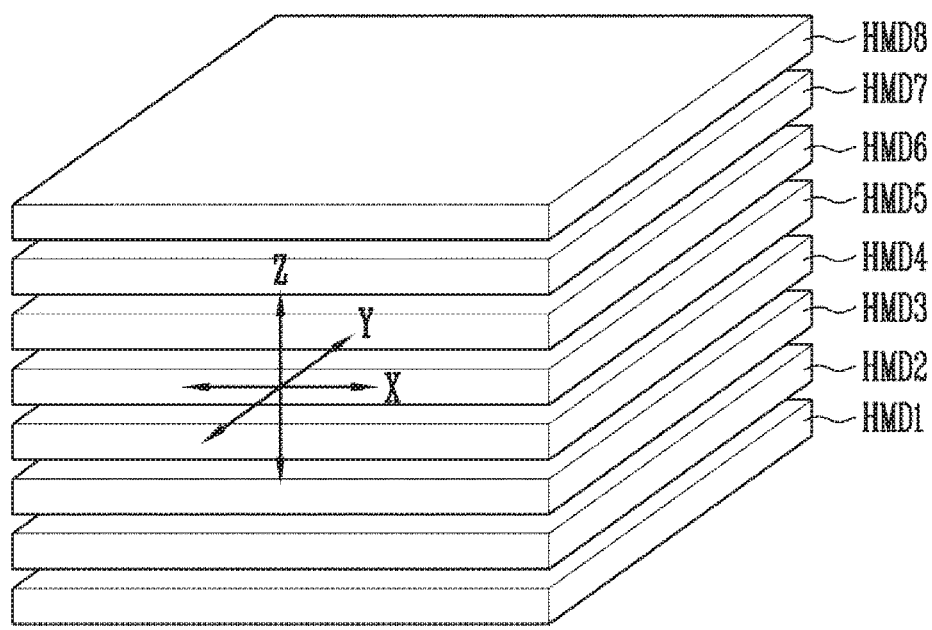
FIG. 16 is a diagram illustrating an effect of the present disclosure.

FIG. 16 is a diagram illustrating an effect of the present disclosure.

Referring to FIG. 16, in a memory device 1100 having a multi-stacked structure, a command and an address are controlled by considering all temperature influences in the first direction X, the second direction Y, and the third direction Z with respect to the memory devices in the memory device 1100. Such an arrangement may prevent a phenomenon in which the temperature in a specific area is increased. That is, in this embodiment, a temperature influence with respect to a request received from the host 2000 and an arbitrary memory device may be calculated, and the command and address may be controlled such that the temperature influence is minimized.

Accordingly, degradation of the performance and shortening of the lifespan of the memory device may be suppressed, and the reliability of the memory controller and the memory system having the same may be improved.

Figure 17:
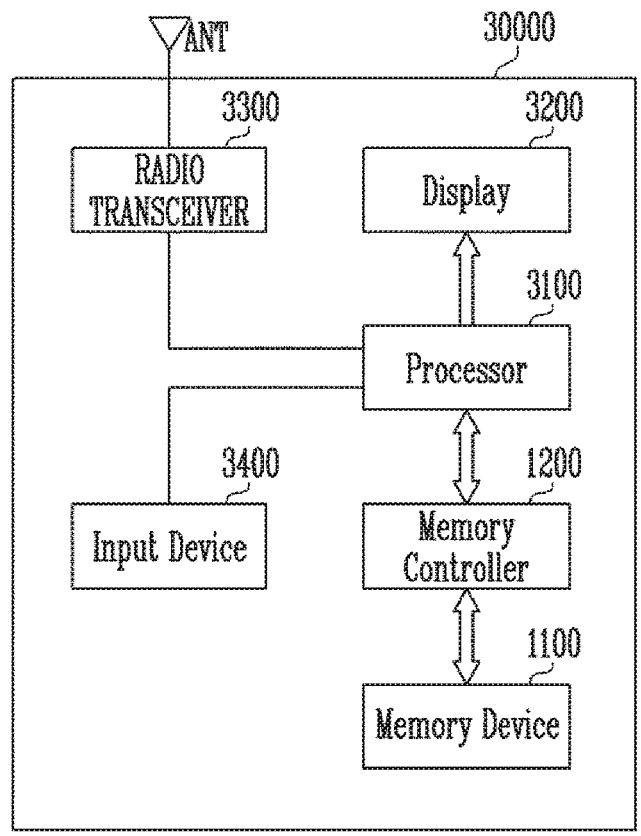
FIG. 17 is a diagram illustrating a memory system including a memory controller in accordance with an embodiment of the present disclosure.

FIG. 17 is a diagram illustrating a memory system 30000 including a memory controller in accordance with an embodiment of the present disclosure, for example, the memory controller 1200 shown in FIG. 1.

Referring to FIG. 17, the memory system 30000 may be implemented as a cellular phone, a smart phone, a tablet personal computer (PC), a personal digital assistant (PDA), or a wireless communication device.

The memory system 30000 may include a memory device 1100 and the memory controller 1200 capable of controlling an operation of the memory device 1100. The memory controller 1200 may control a data access operation of the memory device 1100, e.g., a program operation, an erase operation, a read operation, or the like under the control of a processor 3100.

Data programmed in the memory device 1100 may be output through a display 3200 under the control of the memory controller 1200.

A radio transceiver 3300 may transmit and receive radio signals through an antenna ANT. For example, the radio transceiver 3300 converts a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the memory device 1100. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

Figure 18:
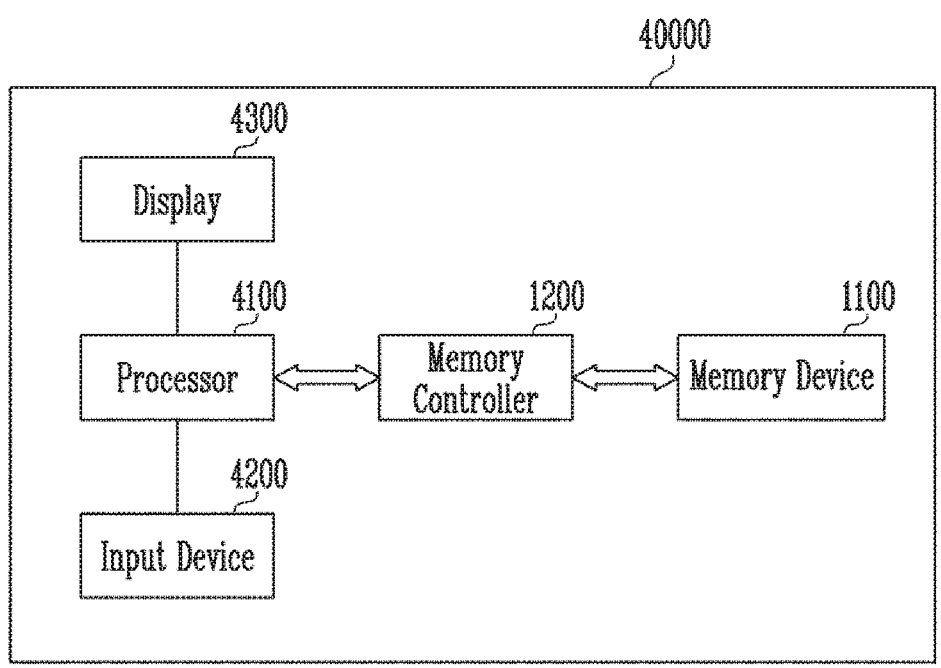
FIG. 18 is a diagram illustrating a memory system including a memory controller in accordance with an embodiment of the present disclosure.

FIG. 18 is a diagram illustrating a memory system 40000 including a memory controller in accordance with an embodiment of the present disclosure, for example, the memory controller 1200 shown in FIG. 1.

Referring to FIG. 18, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory device 1100 and the memory controller 1200 capable of controlling a data processing operation of the memory device 1100.

A processor 4100 may output data stored in the memory device 1100 through a display 4300 according to data input through an input device 4200. For example, the input device 4200 is implemented as a pointing device such as a touch pad or a computer mouse, a keypad, or a keyboard. The processor 4100 may control overall operations of the memory system 40000, and control an operation of the memory controller 1200.

Figure 19:
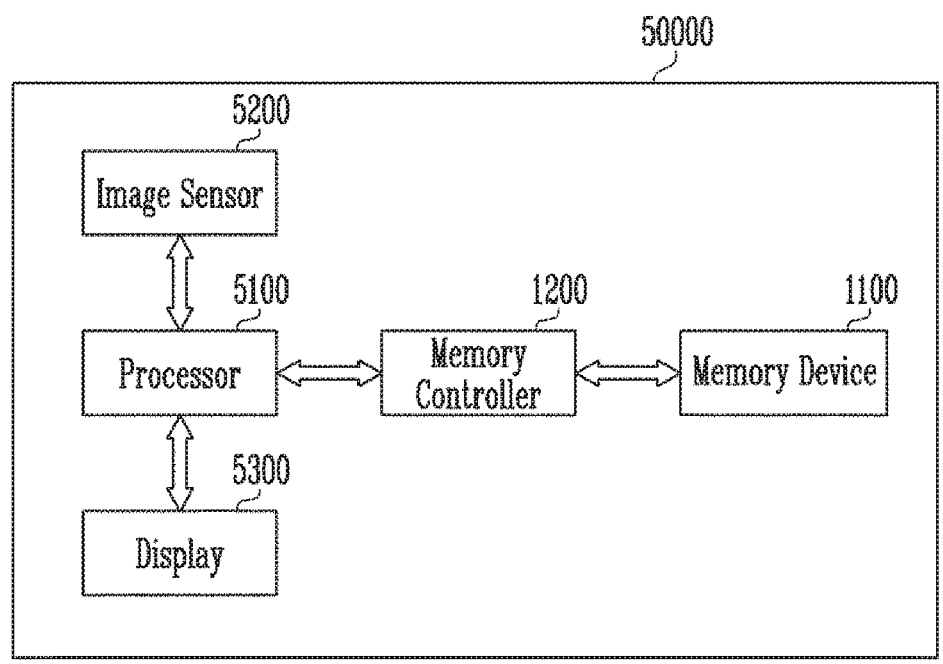
FIG. 19 is a diagram illustrating a memory system including a memory controller in accordance with an embodiment of the present disclosure.

FIG. 19 is a diagram illustrating a memory system 50000 including a memory controller in accordance with an embodiment of the present disclosure, for example, the memory controller 1200 shown in FIG. 1.

Referring to FIG. 19, the memory system 50000 may be implemented as an image processing device, e.g., a digital camera, a mobile terminal having a digital camera attached thereto, a smart phone having a digital camera attached thereto, or a tablet personal computer (PC) having a digital camera attached thereto.

The memory system 50000 may include a memory device 1100 and the memory controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a processor 5100. Under the control of the processor 5100, the converted digital signals may be output through a display 5300, or be stored in the memory device 1100 through the memory controller 1200. In addition, data stored in the memory device 1100 may be output through the display 5300 under the control of the processor 5100.

Figure 20:
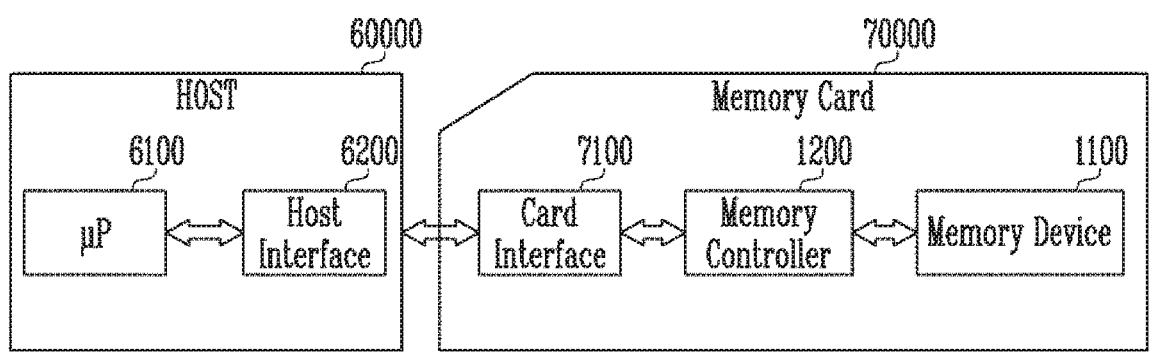
FIG. 20 is a diagram illustrating a memory system including a memory controller in accordance with an embodiment of the present disclosure.

FIG. 20 is a diagram illustrating a memory system 70000 including a memory controller in accordance with an embodiment of the present disclosure, for example, the memory controller 1200 shown in FIG. 1.

Referring to FIG. 20, the memory system 70000 may be implemented as a memory card. The memory system 70000 may include a memory device 1100, the memory controller 1200, and a card interface 7100.

The memory controller 1200 may control data exchange between the memory device 1100 and the card interface 7100. In some embodiments, the card interface 7100 may be a secure digital (SD) card interface or a multi-media card (MMC) interface, but the present disclosure is not limited thereto. The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

The host 60000 may include a microprocessor (µP) 6100 and a host interface 6200. The microprocessor 6100 may control overall operations of the host 60000, and communicate with the memory system 70000 through the host interface 6200.

In accordance with embodiments of the present disclosure, a phenomenon in which the temperature in a specific area of the memory device is increased in an operation of the memory device can be prevented. Accordingly, degradation of the performance and shortening of the lifespan of the memory device can be suppressed, and the reliability of the memory controller and the memory system having the same can be improved.

Various embodiments have been disclosed herein, and although specific terms are employed, they are used and are to be interpreted in a generic and descriptive sense and not for purpose of limitation. In some instances, as would be apparent to one skilled in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller comprising:
    a temperature monitor device configured to count values that vary according to operation statuses of memory devices;
    a status check device configured to output status information of the memory devices based on the count values; and
    a scheduler configured to store the status information according to arrangements of the memory devices, and output the status information in response to a request received from a host,
    wherein the scheduler includes:
    a status table configured to update statuses of the memory devices based on the status information, sort temperature influences corresponding to the arrangements of the memory devices with respect to cases, and store the status information with respect to the cases; and
    a request queue configured to queue the request by comparing addresses of the cases with the request received from the host and determining an arrangement that is less influenced by temperature, relatively.

2. The memory controller of claim 1, wherein the temperature monitor device includes:
    an address decoder configured to decode a physical address generated in response to the request and output a decoded address;
    a command decoder configured to decode a command generated in response to the request and output a decoded command; and
    a temperature table configured to update a count value of a selected memory device according to the decoded address and the decoded command.

3. The memory controller of claim 2, wherein the address decoder translates the physical address into the decoded address to be managed in the temperature table, and outputs the decoded address.

4. The memory controller of claim 2, wherein the command decoder translates the command into the decoded command to be managed in the temperature table, and outputs the decoded command.

5. The memory controller of claim 2, wherein the temperature table:
    categorizes the memory devices hierarchically as high level memory devices, middle level memory devices, each associated with one of the high level memory devices, and low level memory devices, each associated with one of the middle level memory devices;
    stores a count value for each of the low level memory devices; and
    increases or decreases count values of the low level memory devices according to the decoded address and the decoded command.

6. The memory controller of claim 1, wherein the status check device includes:
    a status register configured to store status values of the memory devices, and output a check signal, based on a status value corresponding to the physical address generated in response to the request;
    a counter configured to output a count value whenever the physical address is applied to the status register; and a calculator configured to receive count information on the memory devices from the temperature monitor device, calculate count values of the memory devices, based on the count information, and output the calculation result as the status information.

7. The memory controller of claim 6, wherein the calculator:
calculates a count value of each of middle level memory devices by adding up count values of low level memory devices associated with the corresponding middle level memory device; and
calculates a count value of each of high level memory devices by adding up count values of the middle level memory devices associated with the corresponding high level memory device.

8. The memory controller of claim 1, wherein the status information stored in the status table is stored by considering a spatial arrangement of, including distance between, the memory devices.

9. A memory controller comprising:
a host interface configured to receive requests from a host, and output data read from memory devices to the host; and
a command and address controller configured to update statuses of the memory devices based on status information of the memory devices, sort temperature influences corresponding to arrangements of the memory devices with respect to cases, store the status information with respect to the cases, queue a request by comparing addresses of the cases with the request received from the host and determine an arrangement that is less influenced by temperature.

10. The memory controller of claim 9, wherein the command/address controller includes:
a temperature monitor device configured to count values according to operation statuses of the memory devices;
a status check device configured to output the status information of the memory devices based on the count values; and
a scheduler configured to store the status information on the cases of the temperature influences respectively corresponding to the arrangements of the memory devices, determine the arrangement that is less influenced by the temperature, respectively, based on the request received from the host and the status information, and control the request.

11. The memory controller of claim 10, wherein the temperature monitor device includes:
an address decoder configured to decode a physical address generated in response to the request and output a decoded address;
a command decoder configured to decode a command generated in response to the request and output a decoded command; and
a temperature table configured to update the count values of a selected memory device according to the decoded address and the decoded command.

12. The memory controller of claim 10, wherein the status check device includes:
a status register configured to store status values of the memory devices, and output a check signal, based on a status value corresponding to the physical address generated in response to the request;
a counter configured to output a count value whenever the physical address is applied to the status register; and
a calculator configured to receive count information on the memory devices from the temperature monitor device, calculate the count values of the memory devices, based on the count information, and output a calculation result as the status information.

13. The memory controller of claim 10, wherein the scheduler includes:
a status table configured to update the statuses of the memory devices, sort the temperature influences and store the status information; and
a request queue configured to queue the request.

14. A memory system comprising:
a plurality of memory devices configured to store data; and
a memory controller configured to control the memory devices in response to requests received from a host, store status information on temperature statuses of the memory devices, and output the status information to the host,
wherein the plurality of memory devices include high level memory devices, middle level memory devices, and low level memory devices,
each of the high level memory devices includes an exclusive group of the middle level memory devices, and
each of the middle level memory devices includes an exclusive group of low level memory devices.

15. The memory system of claim 14, wherein each of the low level memory devices is stacked on its associated middle level memory device, and each of the middle level memory devices is stacked on its associated high level memory device.

16. The memory system of claim 15, wherein the memory controller accesses a memory device, among the plurality of memory devices, that is least influenced by temperature, by considering current statuses of the memory devices and the request received from the host.

17. The memory system of claim 14, wherein the memory controller updates, in real time, the temperature statuses of the memory devices.

18. The memory system of claim 17, wherein the memory controller updates the temperature status of each of the memory devices according to a number of times of accessing to the memory device and an operation performed in the memory device.

* * * * *